Dec. 26, 1922.
F. W. PHILLIPS.
STAMPING MACHINE.
FILED FEB. 2, 1922.
1,439,753
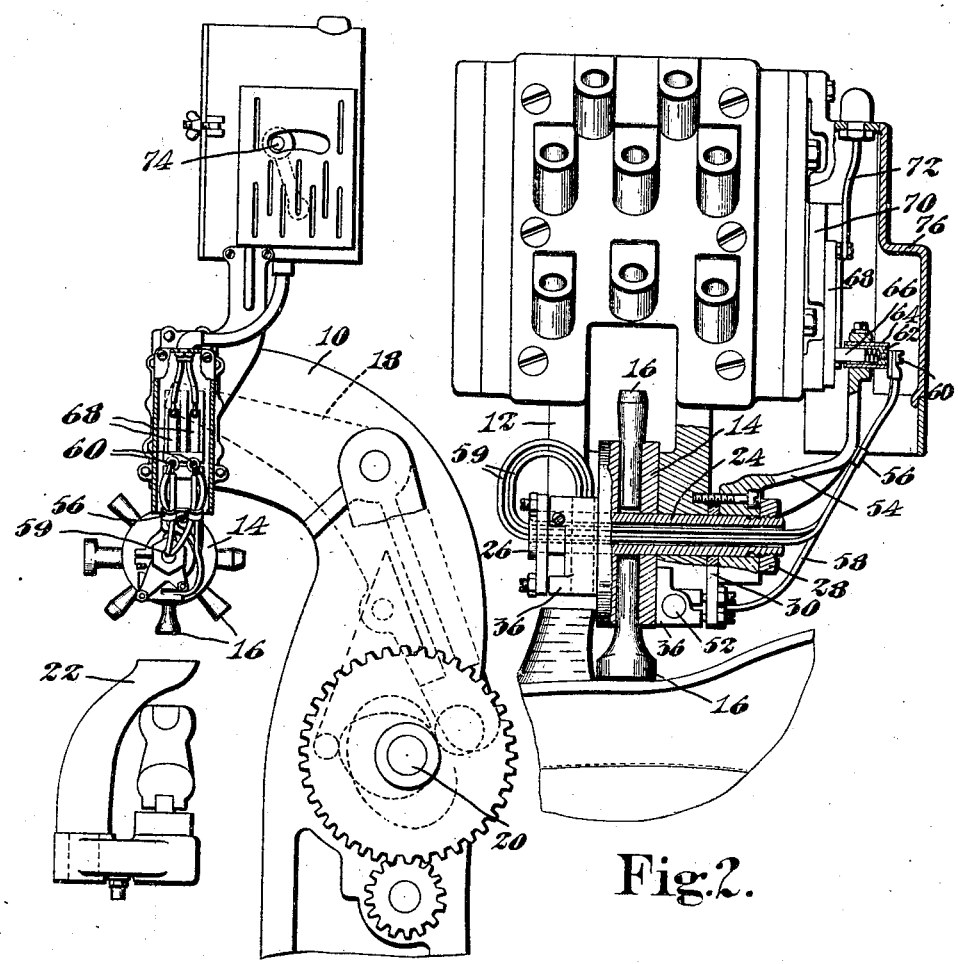
Fig.2.
Fig.1.
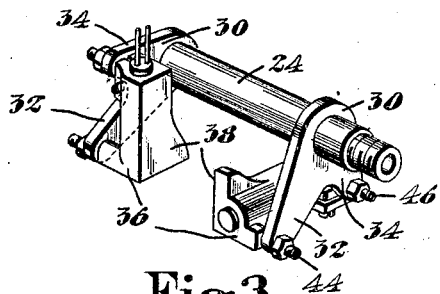
Fig.3.
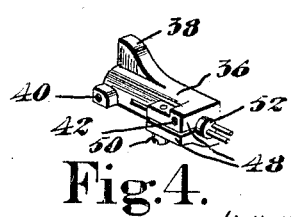
Fig.4.
INVENTOR
Frederick W. Phillips
By his Attorney
Nelson W. Howard Patented Dec. 26, 1922.

1,439,753

UNITED STATES PATENT OFFICE.

FREDERICK W. PHILLIPS, OF WEYMOUTH, MASSACHUSETTS, ASSIGNOR TO UNITED SHOE MACHINERY CORPORATION, OF PATERSON, NEW JERSEY, A CORPORATION OF NEW JERSEY.

STAMPING MACHINE.

Application filed February 2, 1922. Serial No. 533,547.

*To all whom it may concern:*

Be it known that I, FREDERICK W. PHILLIPS, a citizen of the United States, residing at Weymouth, in the county of Norfolk and State of Massachusetts, have invented certain Improvements in Stamping Machines, of which the following description, in connection with the accompanying drawings, is a specification, like reference characters on the drawings indicating like parts in the several figures.

This invention relates to stamping machines of the type employing a heated die to burn an impression and is herein shown as embodied in a machine for so impressing the shank of a shoe.

A machine commonly employed for work of this nature comprises a reciprocating head carrying a rotary turret which has a series of stamping dies radiating from its periphery. The dies have been heated by an electric heating unit inserted within the axis of the turret. Since the unit is necessarily at a considerable distance from the dies, it is apparent that an appreciable amount of heat is lost by radiation and by conduction through the head without ever reaching the dies. It has also been proposed to heat the dies by means of an electric unit which is inserted directly in a socket in the dies themselves. This method, however, although it economizes heat, necessitates the insertion of the unit into each die as the latter is brought around into a working position and does not keep the die hot and ready for use. In all of these machines, there is also a difficulty experienced because the units are on a moving part and the source of current on a fixed part of the frame. As is well known, the frequent bending and twisting of lead wires causes their rapid deterioration and ultimate disintegration.

Accordingly, it is an object of this invention to provide an improved heating means for the dies of stamping machines and one which will economize heat and supply the heating current in a more satisfactory manner. In the illustrated construction, a pair of electric heating units are mounted at the sides of the turret as closely as possible to the dies without interference with the stamping of such articles as high heeled shoes. Preferably, one of the unit supporting plates is arranged to extend downwardly from the axis of the turret and the other to extend laterally of said axis to the end that one unit may be positioned above the lowermost edge of the turret to avoid projecting parts of the work and preheat to some extent the die which is about to reach working position. As a feature of the invention, the supporting plates for the units are made interchangeable so that either can be used on either side of the turret and thus simplify the construction. Where two units are employed, a trunnion, on which the turret turns, is made hollow so that the supply conductors can be passed through it and connected in a more satisfactory manner to that unit which is on the opposite side of the turret from the source of current supply. As a further feature, a sliding contact connection is provided between the source of current supply and the moving head. As shown, a bracket carried by the moving head overlaps a pair of steel plates fixed on the frame and connected to the supply current. The bracket carries the heating unit leads or supply conductors which, through sliding plugs, contact continuously with the fixed plates.

These and other features and advantages of the invention will appear from a consideration of the following specification and the accompanying drawings in which Fig. 1 is a side elevation partly in section;

Fig. 2 is a front elevation on a larger scale and partly in section;

Fig. 3 is a perspective view of the interchangeable supporting means for the heating units and Fig. 4 is a perspective view of one of the heating unit casings.

The frame 10 of the machine has an overhanging arm in the front of which is mounted for reciprocation a head 12 at the lower end of which, between forks, is mounted for rotation a turret 14 carrying a plurality of stamping dies 16. The head 12 is reciprocated by an elbow lever 18 pivoted on the frame and actuated by cams on the power shaft 20. A work support 22 is mounted at the front of the machine directly beneath the turret. All of these parts are old and well known and reference may be had to Patent No. 1,028,567, granted June 4, 1912 on an application of Gordon and Topham for a fuller disclosure of the details.

The turret 14 is supported on a hollow sleeve or trunnion 24 extending between the forks on the head 12 and having, at one end, a head 26 and being threaded at the other end for the reception of a nut 28 by which the parts carried on the trunnion may be clamped in a fixed position. Embracing the hollow sleeve outside of the forks of the head, are a pair of two-armed supporting plates 30. The plates are exactly alike and are interchangeable upon reversal and they are preferably arranged as shown with the arms 32 and 34 of one plate extending downwardly and the corresponding arms of the other plate extending laterally of the head. A heating unit block or casing 36 is secured to the arms of each plate and each block has an extending portion 38 which lies alongside of the turret to give a large conducting surface. Each block 36 has a pair of openings 40 and 42 to receive screws 44 and 46 inserted through the ends of the arms to secure the block in fixed position. Each block 36 is split to form a pair of clamping ears 48 and a clamp screw 50 binds within a socket of the block a cartridge heating unit 52. There is no extended contact between the blocks and parts other than the turret so that little heat is wasted by conduction. The blocks 36 are alike so that they are interchangeable and they are preferably arranged as shown, one of the blocks lying in a horizontal position close to the periphery of the turret and the other lying in a vertical position spaced from the lower edge of the turret so that there is plenty of room for the heel of a shoe or the projecting parts of other articles. Where the dies are used in succession, this arrangement also serves to preheat that die which is about to reach working position.

Since the units move with respect to the frame, it is desirable that there be a connection between the units and the source of current supply, which will preserve the electrical connection. As shown, this is accomplished by a sliding contact connection. Mounted to move with the head and clamped around the trunnion 24, is a bracket 54 having clips 56 to retain in position the supply conductors 58 and 59 which are connected to the heating units. One set of the supply conductors 58 extends directly to the adjacent heating unit while the other set 59 is passed through the hollow sleeve to the opposite heating unit. It is expected that, under some conditions, one of the units may be dispensed with, in which case, one set of the supply conductors need not be used. In that case, either one of the supporting plates and heating unit casings may be used on either side of the turret as desired, a simple reversal adapting them for use in either position. It is apparent also that the different locations of the units will cause the working die to be heated to different degrees and thus there is some room for choice depending on the degree of heat desired. The upper ends of the supply conductors 58, 59 are secured to binding screws 60 attached to the ends of brass bushings 62 which are insulated from the bracket by fibre bushings 64. Spring-pressed carbon plugs 66, inside the bushings, establish a sliding contact connection with plates 68, fixed to the frame and insulated therefrom by fibre blocks 70. Lead wires 72 connect the upper ends of the plates 68 with a rheostat 74 preferably mounted above the overhanging arm of the frame. The contact plates and adjacent parts are enclosed in a suitable casing 76 at one side of the head.

Although the invention has been shown and described with reference to a particular embodiment, it should be understood that the invention is in no way limited thereto.

Having thus described my invention, what I claim as new and desire to secure by Letters Patent of the United States is:—

1. A stamping machine having, in combination, a frame, a reciprocatory head, a rotatable turret carried by the head and having a plurality of stamping dies, plates mounted on a fixed part of the frame and electrically connected with a source of current, supply conductors carried by the head and having sliding contact connection with the plates, a heating unit connected to the supply conductors, and a reversible supporting plate therefor constructed and arranged to support the unit in a horizontal position at one side of the turret or in a vertical position on the other side of the turret.

2. A stamping machine having, in combination, a frame, a reciprocating head, a hollow sleeve carried by the head, a turret rotatable on the sleeve and having a plurality of stamping dies, fixed plates on the frame connected to a source of current, supply conductors carried by the head and having sliding contact connection with the plates, a heating unit connected to the supply conductors, and a reversible supporting plate for holding the unit at either side of the turret, the supply conductors, when the unit is on one side of the turret, passing through the hollow sleeve.

3. A stamping machine having, in combination, a frame, a reciprocating head, a hollow sleeve carried by the head, a turret rotatable on the sleeve and having a plurality of stamping dies, fixed plates on the frame connected to a source of current, supply conductors carried by the head and having sliding contact connection with the plates, interchangeable heating units at the sides of the turret connected to the supply conductors, the conductors for one unit passing through the sleeve, and interchangeable supporting plates for the units carried by the hollow sleeve.

4. A stamping machine having, in combination, a reciprocatory head, a rotatable turret carried by the head and having a plurality of stamping dies to burn an impression in a shoe shank, a pair of interchangeable supporting plates secured to the head, one of the plates extending downwardly and the other laterally of the head, a heating unit secured to the downwardly extending plate and arranged near the periphery of the turret, a second heating unit secured to the laterally extending plate and spaced above the lowermost edge of the turret, and a support for a shoe arranged with its heel under the second heating unit.

5. A stamping machine having, in combination, a reciprocatory head, a stamping die carried by the head, a pair of two-armed supporting plates secured to the head, the arms of one plate extending downwardly and those of the other plate extending laterally of the head, a heating unit carried in a horizontal position by the downwardly extending arms, and a heating unit carried in a vertical position by the laterally extending arms, said supporting plates being interchangeable upon reversal.

6. A stamping machine having, in combination, a reciprocatory head, a stamping die carried by the head, plates mounted on a fixed part of the frame and electrically connected with a source of current, supply conductors carried by the head and having sliding contact connection with the plates, a heating unit connected to the supply conductors, and a reversible supporting plate for the unit constructed and arranged to support the unit on either side of the die.

7. A stamping machine having, in combination, a frame, a reciprocatory head, a rotatable turret carried by the head and having a plurality of stamping dies, a heating unit, a source of current therefor, and a reversible supporting plate for the unit constructed and arranged to support the unit on either side of the turret.

8. A stamping machine having, in combination, a frame, a reciprocatory head, a rotatable turret carried by the head and having a plurality of stamping dies, plates mounted on a fixed part of the frame and electrically connected with a source of current, supply conductors carried by the head and having sliding contact connection with the plates, and a heating unit mounted on the head at the side of the turret and connected to the supply conductors.

9. A stamping machine having, in combination, a frame, a reciprocatory head, a hollow sleeve carried by the head, a turret rotatable on the sleeve and having a plurality of stamping dies, fixed plates on the frame connected to a source of current, a heating unit mounted on the head at each side of the turret, supply conductors connected to each unit and carried by the head, the conductors for one unit passing through the sleeve, and sliding contact connections between the conductors and the plates.

10. A stamping machine having, in combination, a frame, a reciprocatory head, a hollow sleeve carried by the head, a turret rotatable on the sleeve and having a plurality of stamping dies, a heating unit mounted on the head at each side of the turret, supply conductors connected to each unit, the conductors for one unit passing through the sleeve, and a source of current at one side of the head connected to the conductors.

11. A stamping machine having, in combination, a frame, a reciprocatory head, a rotatable turret carried by the head and having a plurality of stamping dies, plates mounted on the frame and electrically connected with a source of current, a bracket carried by the head and overlapping the plates, supply conductors secured to the bracket, spring pressed brushes electrically connected to the conductors and slidably engaging the plates, and a heating unit mounted on the head at the side of the turret and connected to the supply conductors.

In testimony whereof I have signed my name to this specification.

FREDERICK W. PHILLIPS.